United States Patent [19]

Rodal et al.

[11] Patent Number: 4,800,450
[45] Date of Patent: Jan. 24, 1989

[54] METHOD AND APPARATUS FOR CONTROLLING DEPLOYMENT OF A TAPE TRANSPORT MEMBER

[75] Inventors: David R. Rodal, Palo Alto; Nathan W. Osborn, Menlo Park, both of Calif.

[73] Assignee: Ampex Corporation, Redwood City, Calif.

[21] Appl. No.: 850,995

[22] Filed: Apr. 11, 1986

[51] Int. Cl.$^4$ .................. G11B 15/46; G11B 15/48
[52] U.S. Cl. ............................ 360/73.06; 360/95; 360/85; 360/74.1
[58] Field of Search ............... 360/95, 85, 69, 71, 360/93, 73, 84, 83, 74.1

[56] References Cited

U.S. PATENT DOCUMENTS

| | | | |
|---|---|---|---|
| 4,481,551 | 11/1984 | Maeda | 360/85 |
| 4,652,946 | 3/1987 | Ryan | 360/95 |
| 4,686,591 | 8/1987 | Kobayashi et al. | 360/95 |

*Primary Examiner*—John H. Wolff
*Assistant Examiner*—Matthew J. Bussan
*Attorney, Agent, or Firm*—Edward B. Anderson; George B. Almeida; Richard P. Lange

[57] ABSTRACT

Tape guides of a magnetic tape transport machine are controlled during movement by sensing the position of the member as it moves along a defined path in varying velocity corresponding to the position. The member is initially accelerated at a selected rate to a maximum velocity which is then maintained until a distance close to the end position is reached. Velocity is then reduced at a selected rate until another position closer to the end position is reached. At this position a final velocity is maintained until the end is reached. A determination is made of how closely the second distance from the end coincided with reaching the final velocity. The length of the first distance from the end position is adjusted to reduce the difference between the coincidence of reaching the second distance and the final velocity. Further, the sensed final position of the member is retained as the target final position for the subsequent operation.

23 Claims, 7 Drawing Sheets

METHOD AND APPARATUS FOR CONTROLLING DEPLOYMENT OF A TAPE TRANSPORT MEMBER

BACKGROUND OF THE INVENTION

This invention relates to magnetic tape information storage and retrieval apparatus, and particularly, to such apparatus having members movable for manipulating the tape for processing.

Magnetic tape cassettes, for the type having two reels lying in the same plane on parallel axes, are convenient for packaging, shipping and storing tape. The cassette usually can be loaded into an elevator of an operating device, such as a tape transport, which lowers the cassette for engagement of the tape therein to automatically "thread" it into an operating mode within the transport for processing. After the processing, the tape thereby must be "unthreaded" to return it into the cassette for removal of the cassette from the tape transport.

During movement of tape transport members, such as the elevator and tape guides and capstans which carry the tape, it is very desirable to minimize the time of travel of the member so that the tape can be loaded and unloaded as quickly as possible. Conventional devices simply move the members until they contact a mechanical stop. Completed travel is sensed by operation of limit switches. When such members are driven at a high velocity, there is a substantial impact force when the end stop is reached. This becomes particularly significant during the threading operation during which a tape guide moves tape for processing. Tape transports also typically include a tape tension sensing arm which is swingable through a range of movement indicative of the tension on the tape. A supply reel is controlled, ideally, to supply the tape at a rate which maintains the tension at a desired level. If the tape is accelerated too quickly, before the supply reel can release sufficient tape, the tension arm swings to a limited position, resulting in stretching and even breakage of the tape. Once the tape guide achieves a high speed, the supply reel reaches a speed of operation which provides the desired tension on the tape during travel of the member. However, such systems do not have an infinite response bandwidth, and are not able to adjust to changes in velocity instantly. Thus, when the end stop is suddenly reached, the supply reel lets out excess tape, causing a sudden decrease in the amount of tension on the tape. Slack develops in the tape and the tension arm reaches a maximum position beyond which it cannot adjust for the excess tape. The resulting uncontrolled unravelling of tape inside the tape transport can result in substantial damage to the tape.

Apparatus for controlling movement of tape transport members is subject to constantly changing operating conditions. For example, the control circuit may be subject to noise and drifting of component values. Further there may be changes in the mechanical functioning of the devices, such as changes in the friction between moving parts. These changes produce erroneous readings and varying operating performances which make the sensed information different than the actual. It is therefore desirable to have controllers which can adapt to such changing factors.

SUMMARY OF THE INVENTION

The present invention provides a method and apparatus for moving tape transport members in a controlled fashion along their defined paths to provide high velocity movement along most of the travel path and controlled acceleration and deceleration at the end portions of travel.

According to the method of the present invention, the member is moved along a defined path toward an end position, preferably at a high, first selected velocity. The velocity of the member is then reduced to the end position unitl it reaches a lower second velocity before it reaches the end position. In the preferred method of practicing the invention, the position of the member during movement is sensed and a determination is made as to whether the member has reached a first selected distance from the expected end position. After it has reached the first selected distance, the velocity is reduced to the lower velocity. When the end position is reached, it is stopped.

The present method further provides for adaptation to changing operating conditions. In particular, the traveling member is operated so that it does not travel at the higher velocity for too long a period of time, nor slow down to the lower velocity too soon. With regard to the latter, the velocity of the member is reduced from the higher velocity after reaching a second selected distance from the end position which is greater than the first selected distance. The velocity then preferably is reduced at a fixed rate toward the second velocity. The velocity is maintained at the lower velocity after the lower velocity is reached, or, if it does not reach the lower velocity in time, once the first selected distance from the end position is reached. A determination is made of any difference which existed between the position at which the lower velocity is achieved, and the position of the beginning of the first selected distance from the end position. The second selected distance is then changed so that the difference would have been reduced. Also, preferably, that change in difference is made to be small so that the system will not overreact to an unusual travel operation.

The present invention also includes apparatus for controlling movement of the member along the defined path during transport machine operation. In particular, means are provided for moving the member along the defined path toward the end position in response to a control signal. Means for generating a reference signal indicative of a desired velocity of movement, which signal varies with the position of the member along the path in response to the movement of the member along the path, is also provided. Means responsive to both the movement of the member along the path and to the reference signal is provided for generating the control signal for moving the member at desired velocities.

In the particular case where the member is a tape guide, the apparatus includes tape-tensioning means for maintaining tension on the tape within a predetermined range of tensions. The velocities and acceleration selected for operation of movement of the tape guide are appropriate for maintaining the tape tension within the range of the tensioning means.

It will be appreciated that the present invention overcomes many of the disadvantages of the existing apparatus for moving transport members. In particular, due to the frequent repeating of loading, threading, unthreading, and unloading operations of cassettes in a commercial environment, it can be seen that it is important to provide a system which provides rapid operation while limiting the potential damage resulting from uncontrolled acceleration and deceleration in its operation. Further, the present invention provides for adaption of the apparatus to varying operating conditions.

These and additional features and advantages of the present invention will be more clearly understood from a consideration of the drawings and the following detailed description of the preferred embodiments.

BRIEF DESCRIPTION OF THE DRAWINGS

With reference to the accompanying seven sheets of drawings.

DETAILED DESCRIPTION OF THE PREFERRED EMBODIMENTS

Figure 1:
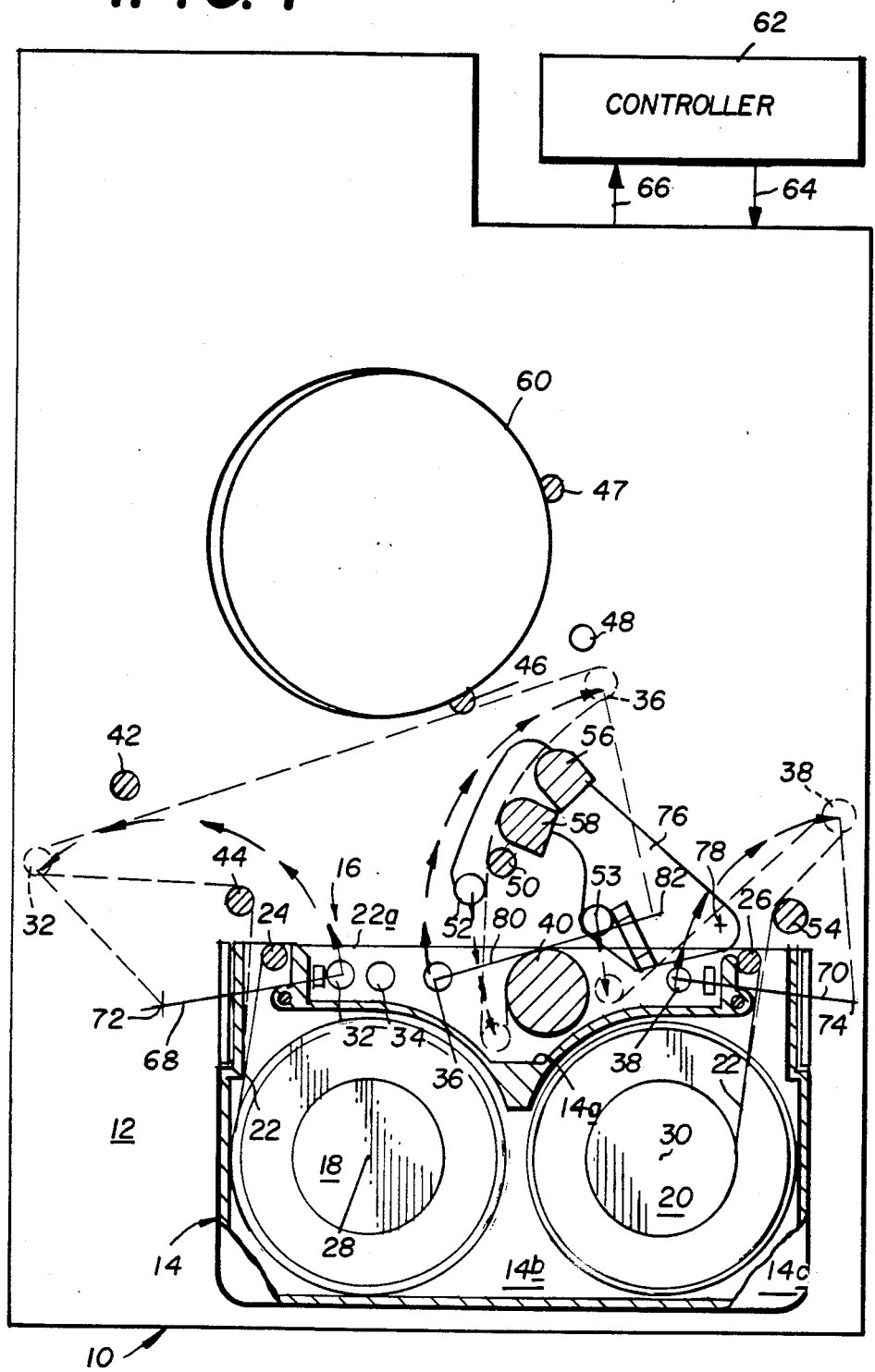
FIG. 1 is a schematic plan view of a tape transport mechanism incorporating a preferred embodiment of the present invention in an initial loading and unloading position.
Figure 2:
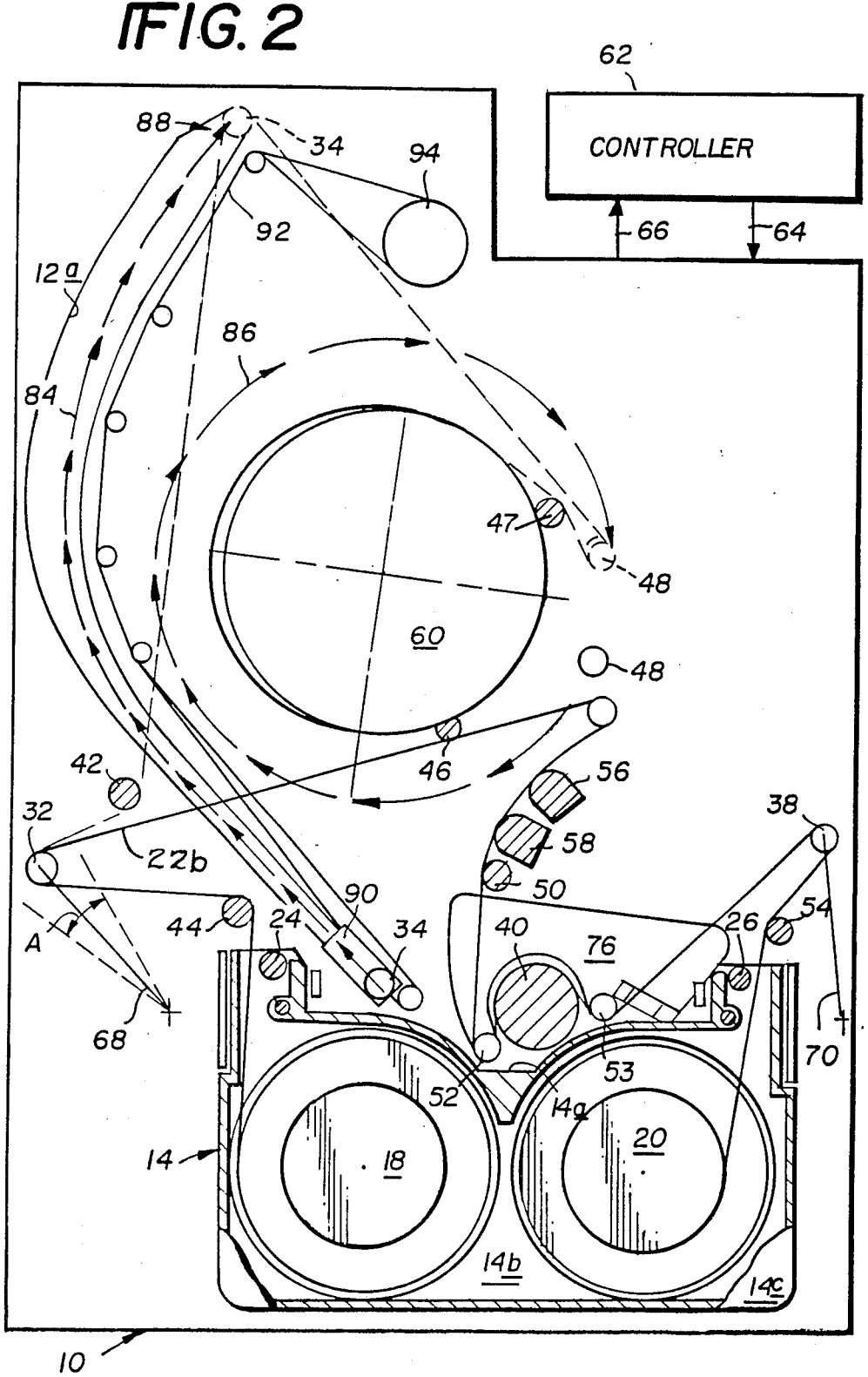
FIG. 2 is a schematic plan view showing the mechanism of FIG. 1 in an intermediate processing position illustrating a fully threaded position.

Referring now to the drawings, and particularly to FIGS. 1, 2, which structurally outline the operation of the apparatus of the invention, there is shown a magnetic tape transport machine 10, and particularly a tape deck plate assembly 12 including a flat plate defining an initial loading plane. Upon this plate is positioned a magnetic tape cassette 14, having one open side 16, and containing a pair of reels, 18, 20, about which opposite ends of a magnetic tape 22 are wound. A run 22a of tape is stretched between the reels and across open side 16 of the cassette as by means of guides, or support posts 24, 26.

Cassette 14 is brought to plate assembly 12 by a loading apparatus or elevator, not shown, and approaches the plate along a path that is normal to plate assembly 12 and parallel to reel axes 28, 30. As cassette 14 is lowered, interior guides 32, 34, 36 and 38, which extend generally normally from the plane of plate assembly 12, are caused to obtrude into a cut-out zone defined by the edges 14a of a lower side wall 14b of the cassette. An upper side wall 14c of the cassette is shown as broken-away except at the lower corners. A cassette is retained in the illustrated position by means not shown, and reels 18, 20, are coupled to tape tensioning and driving motors, also not shown.

It will be noted that the interior guides 32-38 obtrude into the spaces between reels 18, 20 and run 22a. Also obtruding into this space is a large diameter capstan 40, which is also axially normal to the plane of plate assembly 12. Also normal to the plane of the plate assembly are a number of "exterior" elements 42, 44, 46, 47, 48, 50, 52, 53 and 54, and a pair of longitudinal magnetic tape transducing reading/writing heads 56, 58. Capstan 40, heads 56, 58, guides 24, 26, and elements 42, 44, 46, 47, 50, and 54 are cross-hatched to indicate that they are fixed in position on plate assembly 12 during the operation of the transport, although all of them, except the heads, may be rotated about their own axes. The other guides and elements are all movable, as described below.

As shown in FIGS. 1, 2, the first step to be performed in readying the tape for operation, is to engage it with the capstan and the transducing heads, and to apply the tape-tensioning system for so-called "longitudinal" operation in the plane of plate assembly 12, but disengaged from a helical scanning drum 60. This step is performed automatically and under the control of a controller 62, which produces control signals generally indicated at 64, in response to commands from an operator, and also in response to state and condition signals generated by elements of apparatus 10 and generally indicated at 66, some of which pertain to the present invention, as will be further described. Controller 62 and the means for producing signals 64, 66, except for the present invention yet to be specifically described, may all be of types well-known in the art, and are not further described.

Describing now the first-stage threading operation, first the two guides 32, 38, which are mounted on the ends of servo-controlled tape tensioning arms 68, 70, pivoting on axes 72, 74 are caused to engage the inboard side of tape run 22a and to bring the tape partly out of the cassette into a path in contact with elements 44, 32, 52, 38, 54. As soon as this condition is achieved, it becomes possible for controller 62 to permit tape to be further extracted from the cassette while controlling the tape tension by response to signals from arms 68, 70 throughout all of the subsequent threading and operating modes of the machine. Guides 52, 53, which are mounted on a plate 76 that pivots around an axis 78, are caused to pivot (as shown by the paths of arrows leading from these guides) to an inboard position engaging tape run 22a and bracketing capstan 40 so as to wrap the tape around the capstan for a substantial portion of its circumference, and so as to provide the capstan with a good frictional grip on the tape, when the tape is under tension.

At the same time, guide 36, which is mounted on an arm 80 pivoting about an axis 82, is caused to engage the inboard side of tape run 22a and to draw it outwardly and across guide 50 and heads 56, 58. The tape is ready for longitudinal operation, as closely as possible in readiness for helical wrapping around scanning drum 60, and may be fast-wound in either direction, or transduced longitudinally by heads 56, 58 at normal or fast speeds in either direction, and under carefully metered speed control of capstan 40, and carefully-maintained tension control by the servo-tension arms 68, 70, as directed by the operator and controller 62. As will be described further, threading plate 76 is operated according to the present invention.

Referring now to FIG. 2, it will be seen that, even if the tape is still being fast-wound or transduced longitudinally, the helical wrapping phase of the threading operation can be carried out without any interruption. To bring about the helical wrapping of the tape, it is only necessary to move guides 34 and 48 along paths 84, 86 to the final positions shown. While guide 48 is making its circuit around drum 60 and guide 47, guide 34 is also caused to move along its path 84, from a position inside the cassette, and in a generally straight path to engage the inboard side of tape run 22b and thence around to a final position 88. Guide 34 is carried by a carriage 90 which travels in a track 12a existing in plate assembly 12. Movement of carriage 90 is controlled by a wire strand belt 92 connected around a series of pulleys to the carriage and driven by a driving pulley 94. Guide 48 is driven by a mechanical linkage system, not shown. The means for driving these guides in the various paths are controlled by controller 62 along paths the mechanical structure of which are well-known, and will not be further described. The control scheme which is used to move the guides along the defined paths in either direction, according to the present invention, is in a controlled fashion so that appropriate tension can be maintained on the tape during the threading and unthreading operations, to avoid damage, as described previously.

Figure 3:
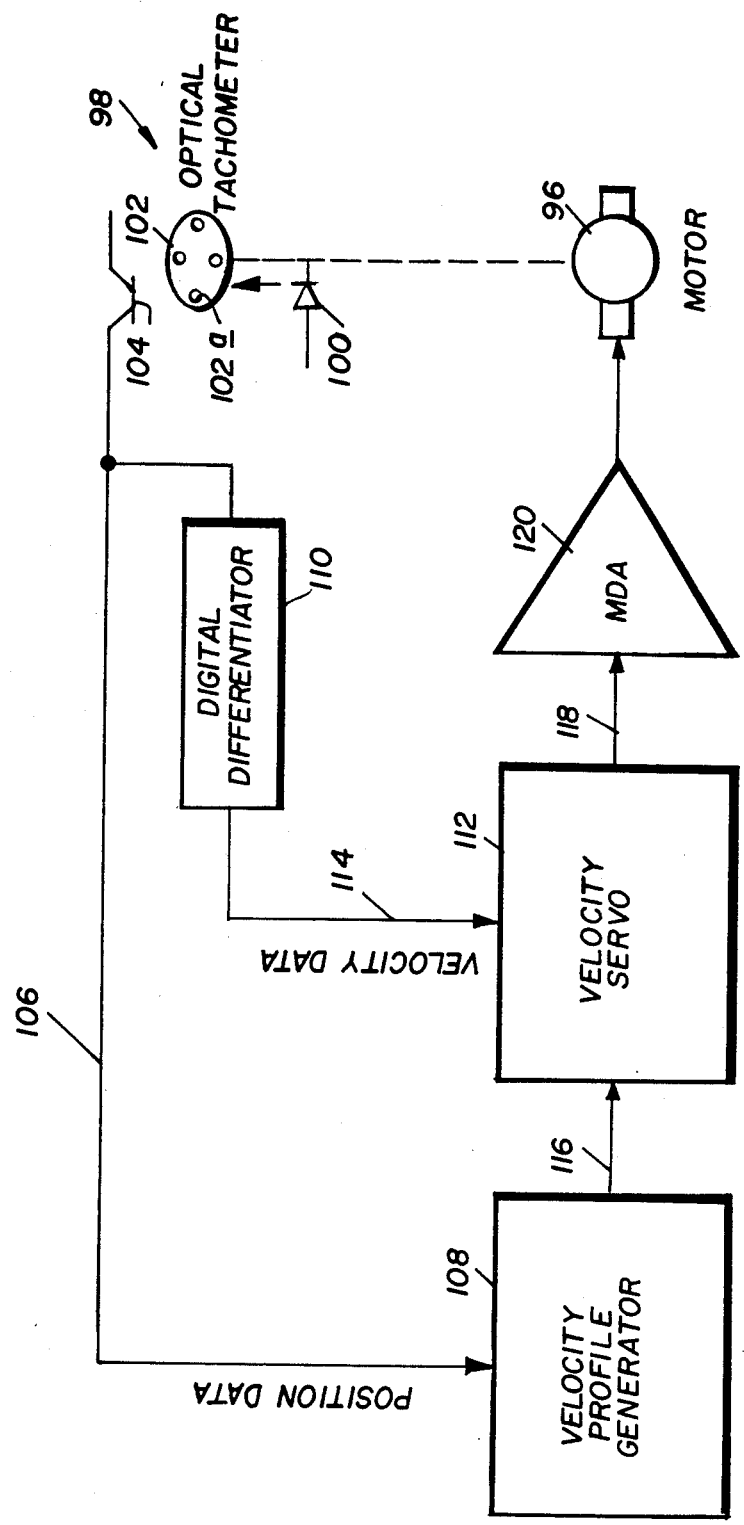
FIG. 3 is a block diagram illustrating one preferred embodiment of the present invention.

Referring now to FIG. 3, a schematic block diagram of a movement-controlling apparatus made according to the present invention, is shown. Included is a motor 96, which drives driving pulley 94 to which is connected an optical tachometer of conventional structure. Tachometer 98 provides means for sensing, by the direct correlation of the rotation of the shaft of motor 96 with the position of guide 34 along the path. Tachometer 98 includes a light emitting diode 100 connected in an appropriate circuit for shining light through a plate 102 coupled to the shaft of motor 96 for rotation therewith. Plate 102 has a plurality of uniformly spaced apertures 102a which allow light to be transmitted, on a predictable basis, through to a phototransistor 104. The impulses produced by phototransistor 104 are transmitted, as part of signals 66, on a lead 106, as position data, to a velocity profile generator 108 contained within controller 62. The position signal on lead 106 is also transmitted through a digital differentiator 110 to a velocity servo 112 over a lead 114. Servo 112 is also included in controller 62 and is of conventional structure, such as that described in U.S. Pat. No. 4,513,229 issued Apr. 23, 1985. The signal on lead 114 provides an indication of the actual velocity of guide 34 by the differentiation of the position information from lead 106.

Profile generator 108 produces a desired or requested velocity signal on a lead 116 which provides a reference input to servo 112. Servo 12 compares the actual velocity determined from the signal on lead 114 to the requested velocity as defined on the signal on 116 to generate an error signal, as part of signals 64, on a lead 118, which serves as a control signal for driving motor 96 through a motor drive amplifier (MDA) 120. The use of profile generator 108 for controlling movement of guide 34 will be described with reference to FIGS. 5, 6A, 6B.

Figure 4:
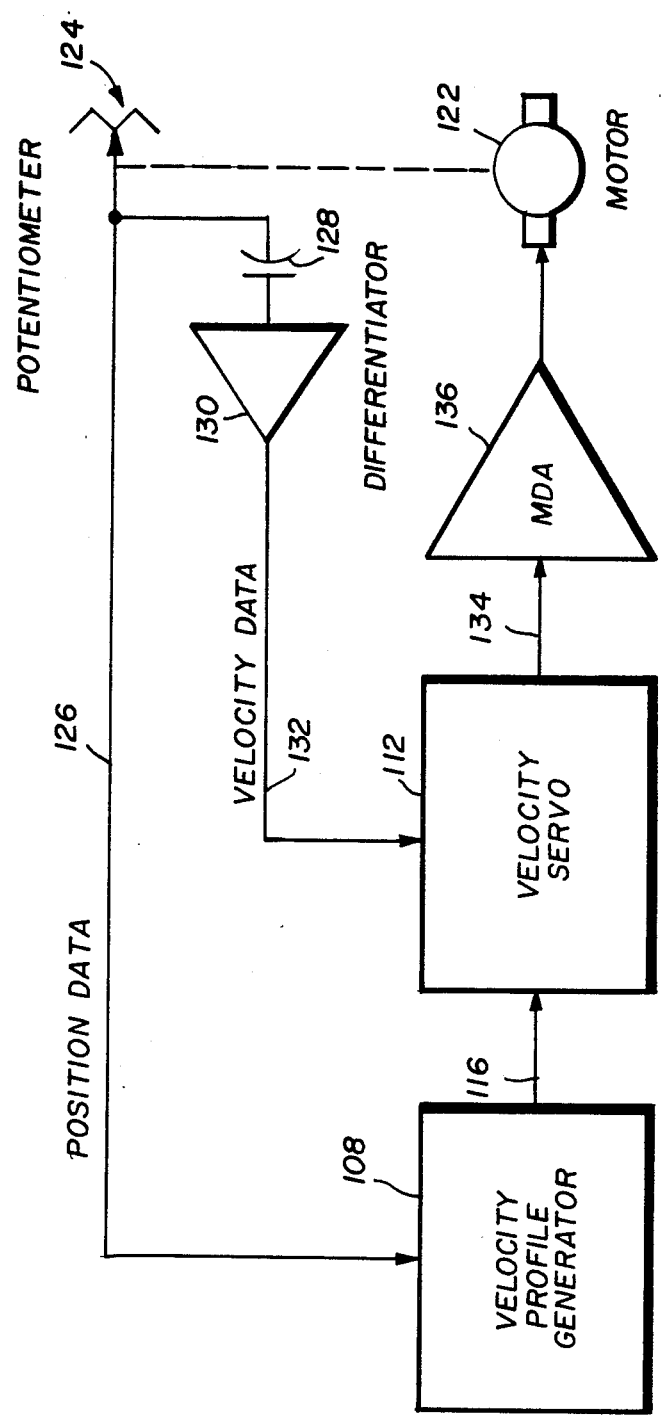
FIG. 4 is a block diagram similar to FIG. 3 showing another preferred embodiment of the present invention.

However, an alternative embodiment for controlling movement of plate 76 is described in FIG. 4. In this case, a motor 122 directly coupled to plate 76 is connected to a potentiometer 124 which produces a signal, forming part of signals 66, on a lead 126 indicative of the position of plate 76. Lead 126 provides input to velocity profile generator 108. Correspondingly, the position signal on lead 126 is connected through an AC coupling capacitor 128 and differentiator 130 to provide velocity data on a lead 132 for input into velocity servo 112. It will be understood that profile generator 108 and velocity servo 112 are part of a conventional microprocessor which, among the numerous other movement of the various control functions, is selectively operated to control the various tape guides and other transport members. Thus, the same profile generator and servo, in effect, can be used to operate the various mechanisms. In this case, servo 112 outputs a motor control signal, as part of signals 64, on a lead 134 to a MDA 136 to drive motor 122.

Figure 5:
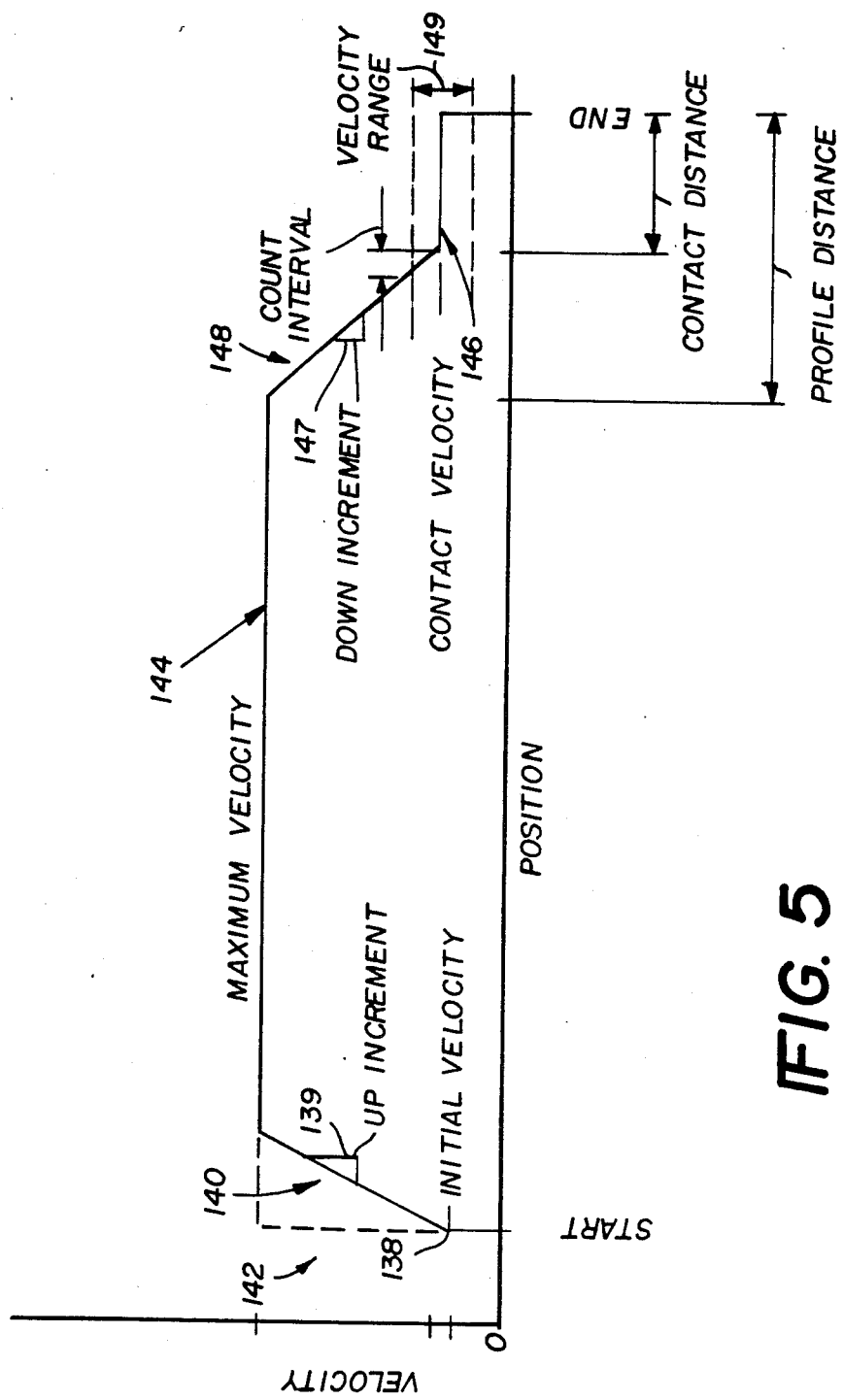
FIG. 5 is a chart of velocity versus position for movement of a tape transport member according to the present invention.
Figure 6A:
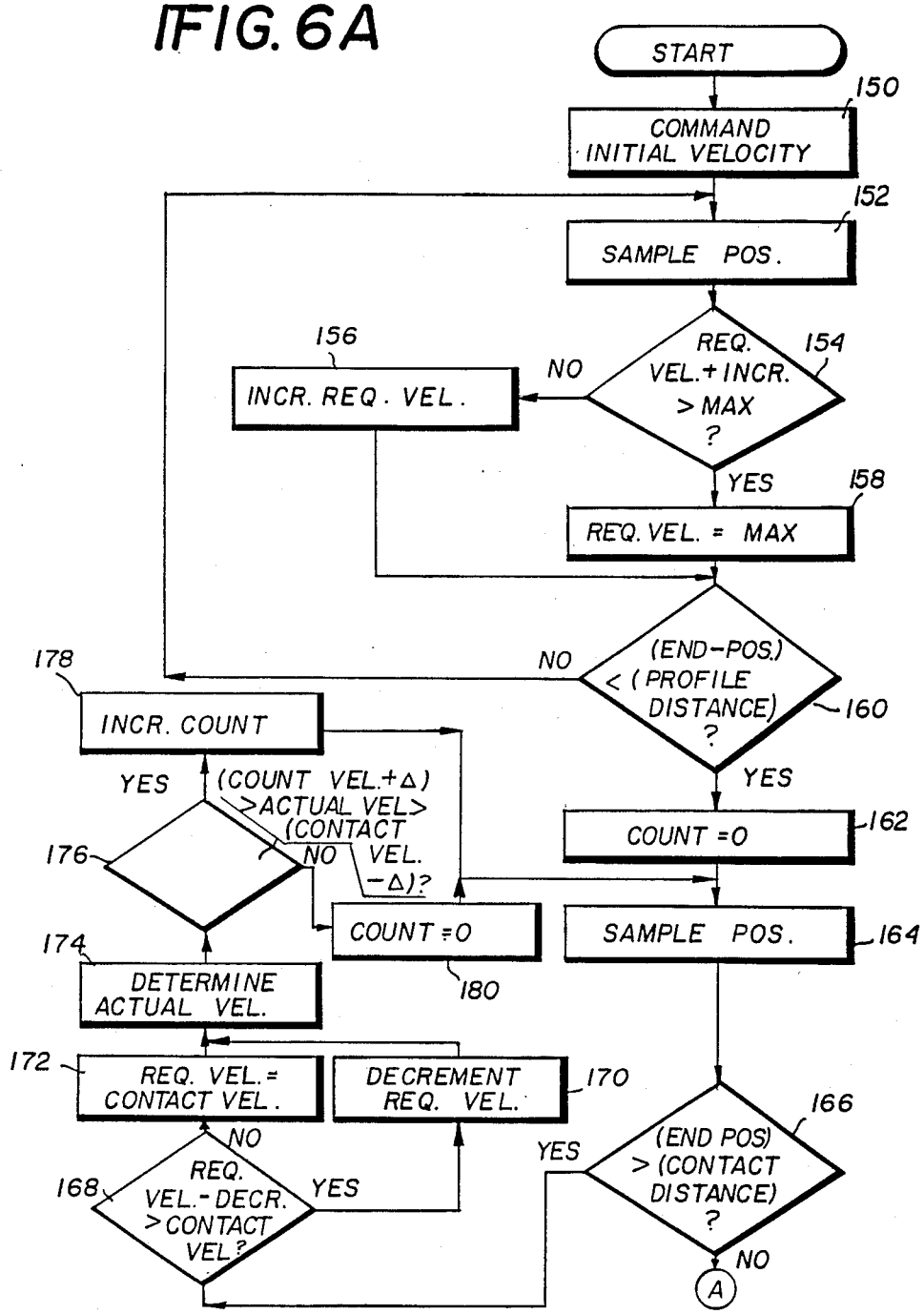
FIGS. 6A-6B, combined, form a flowchart describing the controls for achieving the velocity versus position profile of FIG. 5.
Figure 6B:
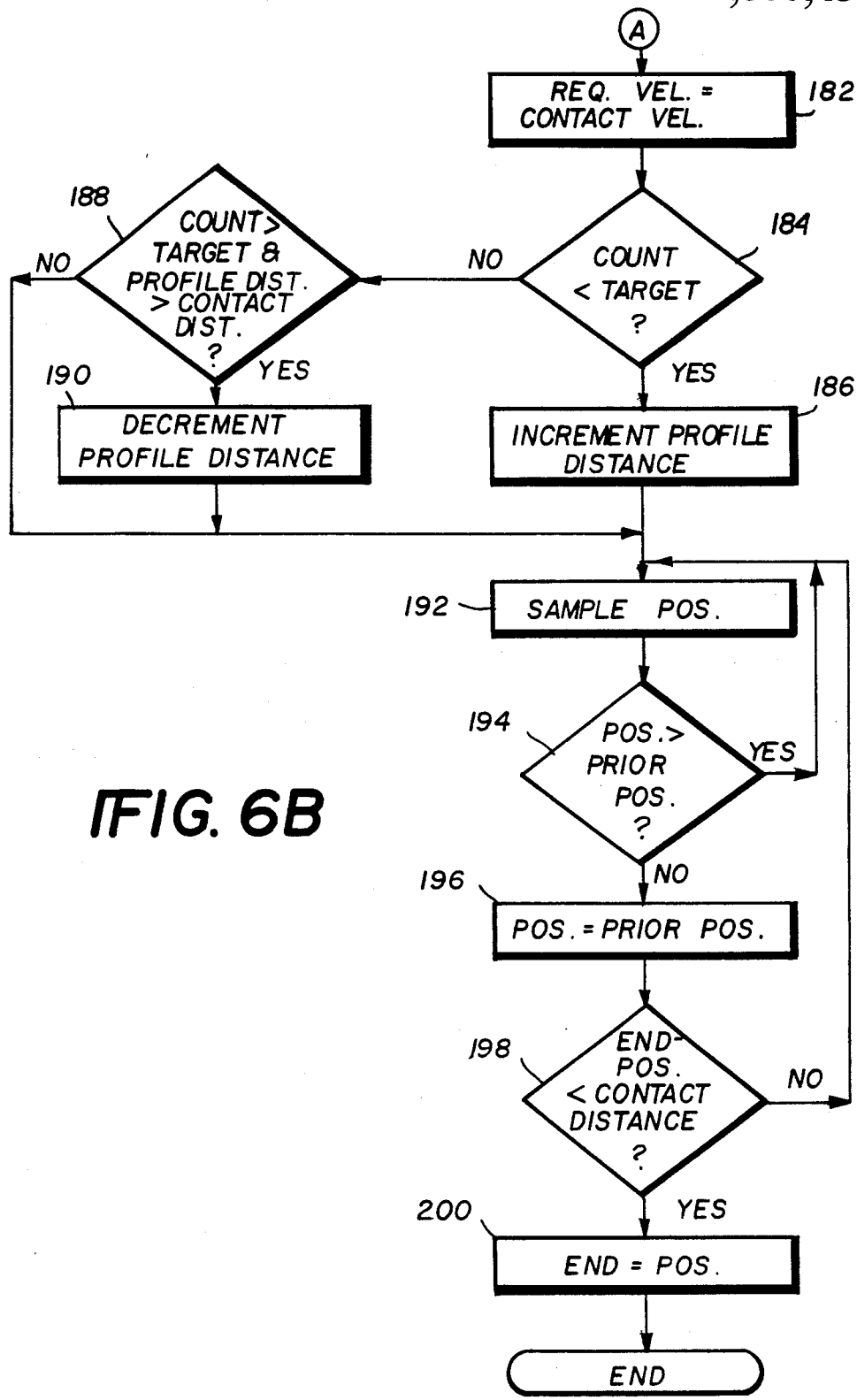

Referring now to FIGS. 5, 6A and 6B, the operation of velocity profile generator 108 will now be described. FIG. 5 shows a representative velocity profile of a tape transport member being moved from the start to an end position along a defined path. It will be understood that this profile is appropriate for operating movement of such a member along a path in either direction of movement. Generally, it is desirable to start the member moving from an initial start position at an initial velocity, which occurs at point 138. If the motor moving the member is sufficiently strong to move the tape faster than the tension adjusting apparatus is capable of accommodating, the velocity is ramped up at a controlled rate represented by up increment 139 in region 140. If the driving motor has a sufficiently low torque, it may be given a high initial velocity command, as represented by dashed line 142. The objective is to bring movement of the arm as quickly as possible to a velocity, shown in region 144, for moving the member at a high rate of speed while allowing the tape tension to be maintained.

In this latter regard, as an example, tape tensioning arm 68 is shown in FIG. 2 to have a range of movement, represented by angle A, beyond which arm 68 cannot travel. Thus, so long as the tape tensioning apparatus is able to maintain the arm within that range of positions, the tension on the tape can be controlled. However, if the tape is let out too quickly, or cannot be taken in quickly enough, excess slack will cause the arm to fall against the outer limit. Correspondingly, if the tape is pulled faster than it is supplied, the arm may be pulled to its inner limit and excess force may be put on the tape.

The velocities selected for the velocity profile shown in FIG. 5 are made appropriate for the particular application in which it is used. That is, the velocity and distance values of the profile are different for guide 34 than they are for plate 76. Correspondingly, it has been found that this velocity profile is appropriate for use in an elevator for loading and unloading cassette 14 into the position shown in FIGS. 1, 2. The velocities in this situation are again selected to comply with the various capacities and limitations of the member being driven and the means for driving it.

Referring again to FIG. 5, it is desirable to move the tape transport member at as fast a rate as possible, for as long as possible. However, in order to control the deceleration of the member when it reaches the end position, it is important to reduce the velocity of the member to a value which is sufficiently low to permit tension control of the tape when the end is reached. This low velocity is shown as a contact velocity existing along a region 146. This velocity is preferably maintained for what is referred to as a contact distance. At some point prior to the beginning of the contact distance, the velocity is reduced from the greater velocity so that it, in an ideal situation, is reduced to the contact velocity at the beginning of the contact distance. Thus, a longer distance, referred to as a profile distance, is selected for beginning the reduction of the velocity. This region of reduction is shown by the down ramp 148. It is preferable that the reduction occur at a selected rate, identified as down increment 147.

As in a conventional system, track 12a, shown in FIG. 2, has a physical end limit. A mechanical end stop defined by the end of the track 12a terminates travel of guide 34. The guide is driven until it contacts the end point, at which time the guide is locked into position and motor 96 is turned off. The movement of plate 76 is terminated in a similar fashion.

The method of achieving the velocity profile in a tape transport member, such as guide 34 or plate 76, is described in further detail in the flowchart given in FIGS. 6A, 6B, When the process of moving the member from one end of the path to the other is started, the command for the initial velocity is provided in block 150. As indicated previously, this may be a reduced velocity, such as initial velocity 138, or the full velocity represented by dashed line 142 in FIG. 5. This begins movement of the member. During processing through the flowchart it will be understood that, as shown in the discussion with reference to FIGS. 3, 4, position data is constantly fed into the profile generator as the member moves along the path by periodic sampling. In the preferred embodiment of this invention, it is desirable to sample the position at regular time intervals, such as each one-sixtieth of a second. One advantage of this is that where the velocity needs to be determined, it is readily determined by two sequentially adjacent position samples. Since the time between samplings is constant, the velocity is readily determined without having to measure the time interval. Thus, once the member has begun moving, the position is sampled at block 152. An evaluation is then made on whether the requested velocity, which is equal to the initial velocity at the first sample plus an increment shown as up increment 139 in FIG. 5, is less than the maximum velocity at 154. Initially, assuming that the initial velocity is less than the maximum velocity, the requested velocity plus an increment will be less than the maximum so that the requested velocity is incremented at 156. However, if the requested velocity when incremented is greater than the maximum, the requested velocity is set equal to the maximum at 158.

An evaluation is then made at 160 to determine whether the member has come within the profile distance. This is an important step, particularly when the member is initially moved, since it may be at an intermediate position. By determining whether or not it is within the profile distance an immediate indication is provided of whether it is desirable to go to the maximum velocity or to use the contact velocity. Certainly during typical travel corresponding to regions 140, 144, the distance of the member from the end is not going to be less than the profile distance. At the appropriate time the position is again sampled at 152.

After the maximum velocity has been reached and the member has progressed just passed the beginning of the profile distance, this event will be recognized at decision 160. A count is started at 162 and set equal to zero. The sample position is again checked at the appropriate time interval at 164. Since it is known that the profile distance has been reached but it is not known whether the contact distance has been reached, this is determined at 166. Assuming that the contact distance has not been reached, then the distance from the end to the member position will still be greater than the contact distance so the process progresses to decision 168. An analysis the reverse of the analysis provided in 154 is performed. In this analysis, a determination is made as to whether the requested velocity reduced by down decrement 147 is above the contact velocity. If so, the requested velocity is decremented at 170. If not, the requested velocity is set equal to the contact velocity at 172. The actual velocity is then determined at 174. As mentioned previously, this is simply a matter of comparing the present position with the position at the previous sampling, with the difference being a direct representation of the actual velocity scaled by the time factor.

A decision is then made at 176 as to whether the velocity is within the defined velocity range 149 shown in FIG. 5. In a normal operation of reducing the velocity from the maximum velocity to the contact velocity over ramp 148, the expected time that will be spent, or the distance which is covered when the velocity first enters the top of the velocity range and until it reaches the contact velocity is known. For the down increment 147 and velocity range 149 shown, approximagtely two time periods are required, ideally.

Depending on the performance of the motor and components involved, this time period can be varied by varying the velocity range. In some situations, a relatively long distance may be covered during the deceleration of the member so that it travels in the velocity window for a longer period of time. Velocities above and below the contact velocity are used so that overshoot of the actual velocity from the contact velocity outside of the range, depending on the stability of the system being used, can be taken into account. As shown in FIG. 5, a count interval will thus relate to the number of counts, as will be seen with further discussion, over which the velocity is within the velocity range. If the actual velocity is within the velocity range, then the count is incremented at 178. If it has not reached the velocity range, then the count is reset to zero at 180 after which, at the appropriate time, a position sample is again taken at 164 and the cycle repeated.

It will be appreciated that profile generator 108 is producing a requested velocity signal on lead 116. The actual velocity which is produced in the motor, will generally lag that of the requested velocity, and further will vary depending on the performance of the system. That is, the member may move at one velocity depending on the temperature of the motor and the inherent friction in the system depending on the temperature of the grease and bearings. There also may be drift in the signals from potentiometer 124 as its temperature changes. Further, it is possible that noise is produced in the signals providing the position and velocity data, so that accurate readings are not always obtained. In essence, the contact distance is a measure of the uncertainty in the system. That is, because of variables, such as those just discussed, the accuracy of the various signals is not known. Thus, by providing a contact distance for achieving the contact velocity, it will be assured that the contact velocity will be reached prior to reaching the end position in a worst case situation.

The ramping down is thus continued until the contact distance is reached at 166. When it is reached, the requested velocity is set to be the contact velocity at 182, regardless of what the actual velocity is. Thus, when the contact distance position is sensed, it is known that the velocity needs to be at the contact velocity, because the end position may in fact, be contacted at any time. Since the contact distance has been reached, an evaluation of the count is then made to determine how closely the ramp down to the contact velocity coincided with the positioning of the member at the beginning of the contact distance. This decision is made at 184 wherein the count is compared to a target value for the count, in this case, usually 2. If the count is less than the target, it means that the contact distance was reached before the contact velocity was. Thus, the profile distance is incremented at 186, making it longer, so that if it operates next time with the same conditions, it will be aligned closer with the actual contact distance.

In the preferred embodiment, the value of the increment is a small percentage, such as below 20%, and even in some situations, below 5%, of the difference between the profile distance and the contact distance. It will be understood that this distance could be set to be a certain proportion of the distance between the contact and profile distances determined by the amount of error. However, it is found to be effective to set it at a fixed value which is known to be small compared to the difference in distances, so that the additional time spent in making the necessary computations is avoided. Further, the amount of adjustment at each given time is limited so that any unusual readings, due to noise in the system or a malfunction, do not cause the system to take on values which would cause it to operate erroneously when the process is repeated for the same member in the same direction.

If the count is not less than the target count, then a compound decision is made at 188 to determine whether the count is greater than the target, and if so, if the profile distance is greater than the contact distance. If both conditions exist the profile distance is decremented at 190, in a fashion similar to that described for incrementing at 186. The second decision of the compound decision at 188 assures that the profile distance will never be reduced to less than the contact distance.

What has just been described with reference to the determining of the count of intervals in velocity range 149, and a readjustment of the profile distance as a result, may be considered a learning process which is performed by profile generator 108. That is, it is able to vary its operation based on the actual performance of the apparatus controlling movement of the tape transport member.

After the profile distance is modified, if necessary, a sample of the member position is again taken, this time at 192. The member is now travelling, ideally, over the contact distance at the contact velocity as shown at 146 in FIG. 5. The important question at this point is whether or not the end position has been reached. This is determined at 194 wherein an evaluation is made as to whether the present position of the member is greater than the prior position. If it is greater, the member is still moving in a forward direction. At appropriate times, the position is sampled at 192.

When the member, or its associated parts, contact an end stop, the member may stay in the same position or it may bounce back a little, if there is a resilient part against which it impacts. If the position of the member has stayed the same or has retreated slightly, the end position is considered to have been reached. The position is then set equal to the prior position which is the furthest distance travelled.

An evaluation is then made at 198 as to whether the present position is within the contact distance from the expected end position. If not, then it may be that the member was inadvertently stopped, such as by a manual interuption, and it is desirable to continue moving the member at the contact velocity. Thus the system returns to sample the position at 192 at the next appropriate time. If the position is within the contact distance then the expected end position for use during the next repetition of the same operation is set equal to the present position, since this is where the member was found to stop. This occurs at 200.

It can thus be seen that when the same movement of the tape transport member is repeated, the contact distances and profile distances will all be related to the newly learned end position and the profile distance will have been adjusted to make the difference between the time or position at which the contact velocity is reached more closely coincide with the beginning of the contact distance, based on the previous operation of the system.

It will thus be appreciated that the present invention provides a method and apparatus for moving a tape transport member along a defined path at a velocity which is as quick as possible, and yet which provides for a controlled or reduced velocity for impact at an end position. Further, this method and apparatus is preferably able to adapt to changing operating conditions in order to assure continued effective operation. Although two preferred embodiments of the present invention have been described each operable with the velocity profile generator of the present invention, it will be appreciated that the invention may be practiced with any member on which it is important that high speed operation is desired and yet which requires a controlled, more limited, speed when the end position is reached.

Thus, while the invention has been particularly shown and described with reference to the foregoing preferred embodiments, it will be understood by those skilled in the art that other changes in form and detail may be made therein without departing from the spirit and scope of the invention as defined in the claims.

What we claim is:

1. A method for moving a tape-carrying member of a tape transport machine comprising the steps of:
   moving the member at a first velocity along a selected path toward a preselected end position;
   periodically sensing the position of the member relative to the preselected end position during said moving along the selected path;
   determining if the sensed position of the member is within a first selected distance from the preselected end position;
   said step of moving further including moving the member at a selected reduced velocity when the member is within the first selected distance from the preselected end position; and
   stopping movement of the member when a true end position is reached.

2. The method of claim 1 wherein said step of stopping includes providing a mechanical stop beyond which the member cannot travel, said method further including the steps of detecting when movement toward the preselected end position has ceased to define said true end position, and storing a value representing said true end position for subsequent use.

3. The method of claim 2 which further includes repeating all of said steps, and during said repeating, said step of determining comprises, determining if the sensed position of the member is within the first selected distance from the sensed position of the member when the member was previously stopped in the previous said steps.

4. A method for moving a tape-carrying member of a tape transport machine comprising the steps of:
   moving the member along a selected path toward an end position;
   sensing the position of the member during said moving;

determining if the sensed position of the member is within a first selected distance from the end position;

said step of moving further including, moving the member at a selected reduced velocity when the member is within the first selected distance from the end position, moving the member at a velocity greater than the selected reduced velocity before the member reaches the first selected velocity, and reducing the greater velocity toward the selected reduced velocity when the position of the member is at a second selected distance greater than the first selected distance from the end position; and stopping movement of the member when the end position is reached.

5. The method of claim 4 wherein said step of reducing further includes reducing the velocity of the member at a selected rate while the member is between the second and first selected distances from the end position.

6. The method of claim 5 including repeating all of said steps, and further including, determining whether the position at which the selected reduced velocity is reached is different than the position expected for the beginning of the first selected distance, and changing the second selected distance by an amount which optimizes the difference between the positions.

7. The method of claim 5 wherein the step of reducing further includes, determining the length of time it takes for the member to travel from a position in which the velocity of the member is within a selected range of velocities, including the selected reduced velocity, to a position the first selected distance from the end position, determining whether that time period is different than a target time period, and changing the second selected distance by an amount which optimizes the difference between the determined time and the target time period.

8. The method of claim 7 wherein said changing includes changing the second selected distance by a fixed amount.

9. A method for threading tape in a tape transport machine comprising the steps of:

moving a tape guide engaging a run of tape, along a selected path toward an expected end position at a first selected velocity until a first selected position is reached;

reducing the velocity of the tape guide at a preselected controlled rate while the guide is between the first selected position and a second selected position relative to the expected end position; and moving the tape guide along the selected path toward the expected end position at a second selected velocity less than the first selected velocity after the tape guide has reached the second selected position until the tape guide reaches a true end position which may be different than the expected end position.

10. The method of claim 9 including repeating all of the steps, and further including the steps of, determining whether the position at which the second selected velocity is reached is different than the second selected position, and changing the first selected position by an amount which minimizes the difference between the position at which the second selected velocity is reached and the second selected position.

11. The method of claim 10 wherein said step of determining further includes, determining the length of time it takes for the guide to travel from a position in which the velocity of the guide is within a selected range of velocities, including the second selected velocity, to the second selected position and determining whether the determined length of time is different than a target time period, and said step of changing includes, changing the first selected position by an amount which reduces the difference between the determined length of time and the target time period.

12. In a tape-transport machine, apparatus for controlling movement of a member along a defined path during operation of the machine, comprising:

means responsive to a control signal for moving the member along the defined path toward an expected end position;

means, responsive to the movement of the member along the path and through first and second selected distances prior to the expected end position, for generating a reference signal indicative of preselected velocities of movement commensurate with the position of the member along the path;

means responsive to the reference signal, for generating the control signal for moving the member at one of the preselected velocities; and means responsive to the member arriving at a true end position, for modifying the second selected distance in accordance with the true end position.

13. The apparatus of claim 12 wherein said reference signal generating means includes:

means for generating a reference signal commensurate with moving the member at a greater velocity prior to the second selected distance, and at a reduced velocity after the member reaches the first selected distance, and for generating a reference signal for reducing the velocity of the member from the greater velocity toward the reduced velocity after the member reaches the second selected distance from the true end position.

14. The apparatus of claim 13 wherein said reference signal generating means reduces the velocity of the member at a selected controlled rate as the member moves from the second to the first selected distance.

15. The apparatus of claim 12 wherein said modifying means is responsive to the difference between the expected end position and the true end position, for changing the second selected distance by an amount which optimizes the difference between the expected and true end positions.

16. The apparatus of claim 15 wherein said reference signal generating means changes the second selected distance by a fixed amount.

17. The apparatus of claim 12 wherein the member is a tape guide which moves a run of tape as the tape guide is moved along the defined path, said apparatus further including means for adjusting the tension on the tape during movement of the run of tape, which adjusting means is capable of adjusting the tension on the tape so long as the tension is within a known range of tension, said reference signal generating means generating a reference signal indicative of velocities which produce a change of tension within the predetermined range.

18. A tape-transport machine comprising:

tape-supporting guide means;

means defining a path along which said guide means is movable;

means responsive to a control signal for moving said guide means along the defined path toward an end position at velocities determined by said control signal;

means for sensing the position of said guide means as it moves along the defined path and for generating a position signal indicative of the position of said guide means;

means, responsive to the position signal for generating a reference signal indicative of a selected velocity of movement of said guide means while said guide means is within a first selected distance from the end position of the path and indicative of a desired greater velocity before said guide means reaches said first selected distance;

means responsive to the position signal for generating a signal indicative of the actual velocity of said guide means; and means responsive to the signal indicative of the actual velocity and to the reference signal, for generating the control signal for moving said guide means at the desired velocities.

19. The machine of claim 18 wherein said reference signal generating means generates a reference signal for reducing the velocity of said guide means from the greater velocity toward the selected velocity when said guide means reaches a second selected distance from the end position which is greater than the first selected distance.

20. The apparatus of claim 19 wherein said reference signal generating means generates a reference signal for reducing the velocity of said guide means at a selected rate.

21. The apparatus of claim 20 wherein said reference signal generating means is responsive to the difference between the position at which the selected velocity is reached and the position of the beginning of the first selected distance for changing the second selected distance by an amount which would have resulted in a reduced difference between the positions.

22. The apparatus of claim 21 wherein said reference signal generating means changes the second selected distance by a fixed amount.

23. The apparatus of claim 18 wherein said guide means moves a run of tape as said guide means is moved along the defined path, said machine further including means for adjusting the tension on the tape during movement of the run of tape, which adjusting means is capable of adjusting the tension on the tape so long as the tension is within a known range of tension, said reference signal generating means generating a reference signal indicative of velocities which produce a change of tension within the predetermined range.

* * * * *

UNITED STATES PATENT AND TRADEMARK OFFICE
CERTIFICATE OF CORRECTION

PATENT NO. : 4,800,450

DATED : January 24, 1989

INVENTOR(S) : David R. Rodal and Nathan W. Osborn

It is certified that error appears in the above-identified patent and that said Letters Patent is hereby corrected as shown below:

Column 1, line 11, "for" should read --of--.

Column 1, line 19, "thereby" should read --therein--.

Column 5, line 42, "12" should read --112--.

Column 7, line 6., "6B, should read --6B.--.

Signed and Sealed this

Twenty-fourth Day of April, 1990

Attest:

HARRY F. MANBECK, JR.

*Attesting Officer*     *Commissioner of Patents and Trademarks*